US010866864B2

(12) United States Patent
Bharadwaj et al.

(10) Patent No.: US 10,866,864 B2
(45) Date of Patent: Dec. 15, 2020

(54) SYSTEMS AND METHODS FOR BACKING-UP AN EVENTUALLY-CONSISTENT DATABASE IN A PRODUCTION CLUSTER

(71) Applicant: Veritas Technologies LLC, Mountain View, CA (US)

(72) Inventors: Vaijayanti Bharadwaj, Baner (IN); Chirag Dalal, Pune (IN); Vinay Sharma, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 344 days.

(21) Appl. No.: 15/934,440

(22) Filed: Mar. 23, 2018

(65) Prior Publication Data

US 2019/0294509 A1 Sep. 26, 2019

(51) Int. Cl.
*G06F 16/23* (2019.01)
*G06F 11/14* (2006.01)
*H04L 29/08* (2006.01)

(52) U.S. Cl.
CPC ...... *G06F 11/1464* (2013.01); *G06F 11/1451* (2013.01); *G06F 11/1453* (2013.01); *G06F 11/1456* (2013.01); *G06F 11/1458* (2013.01); *G06F 11/1469* (2013.01); *H04L 67/1097* (2013.01); *G06F 2201/80* (2013.01)

(58) Field of Classification Search
CPC ............. G06F 11/1469; G06F 16/2379; G06F 16/2373
USPC .................................................. 707/640, 641
See application file for complete search history.

(56) References Cited

U.S. PATENT DOCUMENTS

| 6,278,992 | B1 * | 8/2001 | Curtis | G06F 16/2237 707/711 |
| 7,797,410 | B2 * | 9/2010 | Westerdal | H04L 29/12066 709/223 |
| 2019/0266057 | A1 * | 8/2019 | Dalal | G06F 11/1451 |

* cited by examiner

*Primary Examiner* — Baoquoc N To
(74) *Attorney, Agent, or Firm* — FisherBroyles, LLP

(57) ABSTRACT

The disclosed computer-implemented method for backing-up an eventually-consistent database in a production cluster may include (1) forming, on a production node, a stable copy of production data, (2) provisioning storage on a backup node based on an amount of data in the stable copy and a replication factor, (3) transferring information from the stable copy to a backup copy on the backup node, (4) performing record synthesis on the backup copy to merge record updates into complete backup records, (5) identifying and discarding any stale records and any redundant records in the complete backup records, and (6) transferring the complete backup records from the backup node to a cloud storage device. Various other methods, systems, and computer-readable media are also disclosed.

20 Claims, 4 Drawing Sheets

SYSTEMS AND METHODS FOR BACKING-UP AN EVENTUALLY-CONSISTENT DATABASE IN A PRODUCTION CLUSTER

BACKGROUND

Recent years have produced increases in numbers of scale-out high-performance databases, such as Apache's CASSANDRA, that run on commodity hardware. Typical production deployments of these databases may involve large numbers of nodes, such as 64 nodes or more. One of the largest production deployments of high-performance databases is Apple's database, that has over 75,000 nodes storing over 10 PB of data. Other large CASSANDRA installations include Netflix (2,500 nodes, 420 TB), Chinese search engine Easou (270 nodes, 300 TB), and eBay (over 100 nodes, 250 TB).

There are many challenges to backing-up high-performance databases. Some considerations include:

Data size: high-performance databases often have huge datasets (typically, of an order of multiple terabytes). These large datasets must be protected within short spans of time.

Replica reconciliation: Systems that implement eventual consistency may pose problems in determining points-in-time because of absence of authoritative copies.

Deduplication challenges: Storage formats of these systems range from file-level replicas to record-level replicas. Significant resources are necessary to copy all duplicates resulting from replication strategies. Conventional deduplication approaches may not work.

Topological differences: Next-generation hardware architectures provide better compute and storage stacks. Efficiently exploiting these architectures requires topology changes in scale-out high-performance database systems.

Reconfiguration tolerant protection: For scale-out high-performance database systems, nodes joining and leaving clusters are common scenarios.

Garbage collection: To gain maximum performance, modern databases use log-structured storage formats, are immutable, and/or are append only. These formats never overwrite in-place and hence data files keep increasing in size although there is no way to access previous versions of the data.

The instant disclosure, therefore, identifies and addresses a need for systems and methods for backing-up an eventually-consistent database in a production cluster.

SUMMARY

As will be described in greater detail below, the instant disclosure describes various systems and methods for backing-up an eventually-consistent database in a production cluster.

In one embodiment, a method for backing-up an eventually-consistent database in a production cluster may include (1) forming, on a production node, a stable copy of production data, (2) provisioning storage on a backup node based on an amount of data in the stable copy and a replication factor, (3) transferring information from the stable copy to a backup copy on the backup node, (4) performing record synthesis on the backup copy to merge record updates into complete backup records, (5) identifying and discarding any stale records and any redundant records in the complete backup records, and (6) transferring the complete backup records from the backup node to a cloud storage device.

In embodiments, the method may include identifying a topology of a production cluster of which the production node is a constituent part to identify the production node as requiring backup. In one example, the method may include determining the amount of data in the stable copy. In examples, the method may include provisioning the backup node in a backup cluster based on the amount of data in the stable copy.

In embodiments, the method may include reverting the backup node to a pre-transfer state. In some examples, a number of production nodes in a production cluster of which the production node is a constituent part does not equal a number of backup nodes in a backup cluster of which the backup node is a constituent part. In examples, the method may include restoring the backup copy from the cloud storage device to the production node.

In one example, a system for backing-up an eventually-consistent database in a production cluster may include several modules stored in memory, including (1) a forming module, stored in a memory, that forms, on a production node, a stable copy of production data, (2) a provisioning module, stored in the memory, that provisions storage on a backup node based on an amount of data in the stable copy and a replication factor, (3) a first transferring module, stored in the memory, that transfers information from the stable copy to a backup copy on the backup node, (4) a performing module, stored in the memory, that performs record synthesis on the backup copy to merge record updates into complete backup records, (5) an identifying and discarding module, stored in the memory, that identifies and discards any stale records and any redundant records in the complete backup records, and (6) a second transferring module, stored in the memory, that transfers the complete backup records from the backup node to a cloud storage device. The system may also include at least one physical processor that executes the forming module, the provisioning module, the first transferring module, the performing module, the identifying and discarding module, and the second transferring module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) form, on a production node, a stable copy of production data, (2) provision storage on a backup node based on an amount of data in the stable copy and a replication factor, (3) transfer information from the stable copy to a backup copy on the backup node, (4) perform record synthesis on the backup copy to merge record updates into complete backup records, (5) identify and discard any stale records and any redundant records in the complete backup records, and (6) transfer the complete backup records from the backup node to a cloud storage device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Figure 1:
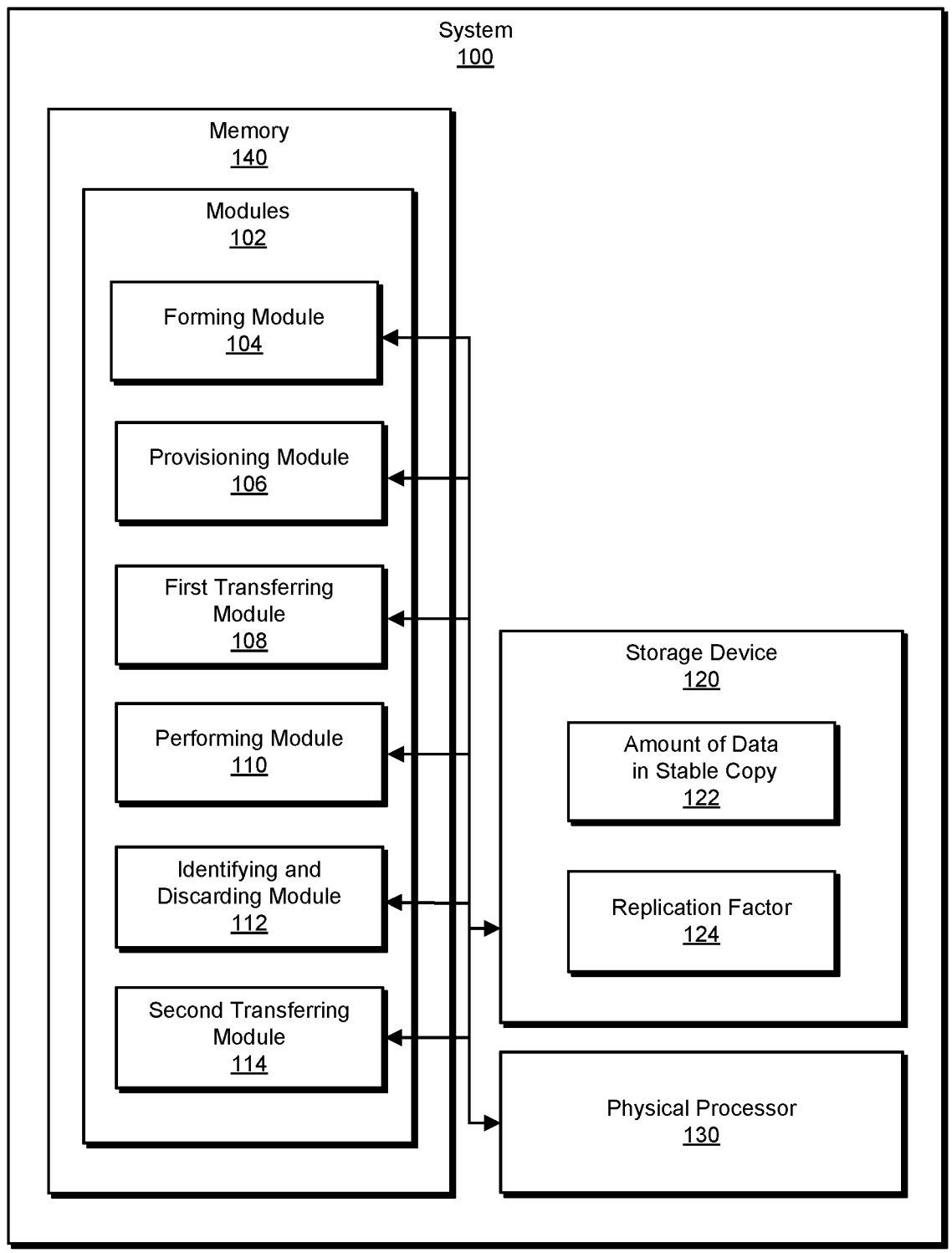
FIG. 1 is a block diagram of an example system for backing-up an eventually-consistent database in a production cluster.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for backing-up an eventually-consistent database in a production cluster. The provided systems and methods may perform backup and/or restoration of an eventually-consistent, scale-out database (e.g., like CASSANDRA) in a phased manner that enables repair-less restore, replica removal, and record synthesis. In some examples, the systems and methods described herein may form a stable copy of production data on a production node, transfer information from the stable copy to a backup copy on a backup node, merge record updates into complete backup records while discarding stale and redundant records, and transfer the complete backup records from the backup node to a cloud storage device. In embodiments, the disclosed techniques may be utilized in connection with cloud-based storage devices.

By doing so, in examples, the systems and methods described herein may improve the functioning of computing devices by automatically protecting large datasets within short spans of time, providing authoritative copies, solving deduplication challenges, backing-up records stored in changing architectures, backing-up records of reconfigured nodes, and/or backing-up data files that increase in size over time, thus enabling cost-effective storage management. Also, in examples, the systems and methods described herein may also save power and/or better-manage network bandwidth utilization.

Figure 2:
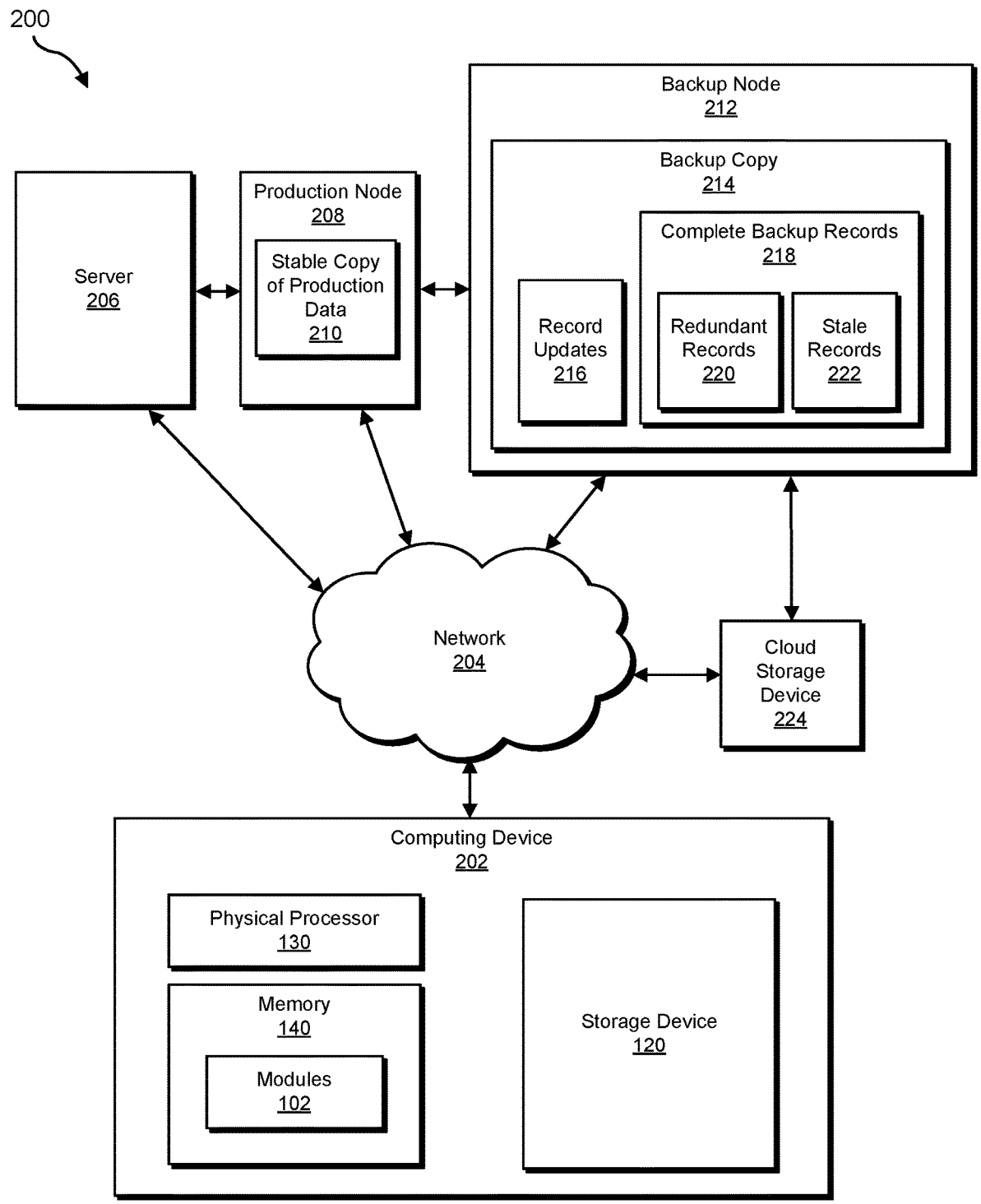
FIG. 2 is a block diagram of an additional example system for backing-up an eventually-consistent database in a production cluster.

The following will provide, with reference to FIGS. 1-2, detailed descriptions of example systems for backing-up an eventually-consistent database in a production cluster. Detailed descriptions of corresponding computer-implemented methods will also be provided in connection with FIGS. 3-4.

FIG. 1 is a block diagram of an example system 100 for backing-up an eventually-consistent database in a production cluster. As illustrated in this figure, example system 100 may include one or more modules 102 for performing one or more tasks. As will be explained in greater detail below, modules 102 may include a forming module 104, a provisioning module 106, a first transferring module 108, a performing module 110, an identifying and discarding module 112, and/or a second transferring module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, server 206, production node 208 backup node 212, and/or cloud storage device 224). One or more of modules 102 in FIG. 1 may also represent all or portions of one or more special-purpose computers configured to perform one or more tasks.

As illustrated in FIG. 1, example system 100 may also include one or more storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of an amount of data in stable copy 122 and/or replication factor 124. In one example, storage device 120 may store, load, and/or maintain information indicating one or more of production data, stable copy of production data 210, backup copy 214, record updates 216, complete backup records 218, redundant records 220, and/or stale records 222. Examples of storage device 120 include, without limitation, Random Access Memory (RAM), Read Only Memory (ROM), flash memory, Hard Disk Drives (HDDs), Solid-State Drives (SSDs), optical disk drives, caches, AMAZON ELASTIC BLOCK STORE service, variations or combinations of one or more of the same, and/or any other suitable storage memory.

The term "replication factor," as used herein, generally refers to an integer number of copies of data stored across a cluster of nodes. For example, without limitation, when a cluster's replication factor equals two and data is written to the cluster, two copies of the data are stored (e.g., in different nodes and/or racks) within the cluster. A replication factor greater than one may provide fault tolerance.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate backing-up an eventually-consistent database in a production cluster. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

Example system 100 in FIG. 1 may be implemented in a variety of ways. For example, all or a portion of example system 100 may represent portions of example system 200 in FIG. 2. As shown in FIG. 2, system 200 may include a computing device 202 in communication (e.g., via a network 204) with a server 206, a production node 208, a backup node 212, and/or a cloud storage device 224. In one example, all or a portion of the functionality of modules 102 may be performed by computing device 202, server 206, production node 208, backup node 212, cloud storage device 224, and/or any other suitable computing system. In examples, all or a portion of example system 100 may be a constituent component of computing device 202, server 206, production node 208, a production cluster, backup node 212, a backup cluster, cloud storage device 224, and/or any other suitable computing system. As will be described in greater detail below, one or more of modules 102 from FIG. 1 may, when executed by at least one processor of computing device 202, server 206, production node 208, backup node 212, and/or cloud storage device 224, enable computing device 202, server 206, production node 208, backup node 212, and/or cloud storage device 224 to back-up an eventually-consistent database in a production cluster. In examples, production node 208 may be a constituent component of a production cluster. In embodiments, backup node 212 may be a constituent component of a backup cluster, such as a CASSANDRA cluster.

Computing device 202 generally represents any type or form of computing device capable of reading computer-executable instructions. In some examples, computing device 202 may represent a computer running storage management software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Server 206 generally represents any type or form of computing device that is capable of reading computer-executable instructions. In some examples, computing device 206 may represent a computer running storage management software. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another.

Production node 208 generally represents any type or form of computing device that is capable of reading computer-executable instructions and/or storing information. In some examples, production node 208 may represent a computer running storage software. Additional examples of production node 208 include, without limitation, storage servers, database servers, application servers, and/or web servers configured to run certain software applications and/or provide various storage, database, and/or web services. Although illustrated as a single entity in FIG. 2, production node 208 may include and/or represent a plurality of servers that work and/or operate in conjunction with one another. In examples, production node 208 may be a constituent component of a production cluster. In embodiments, production node 208 may be a part of a cluster of nodes storing information for an APACHE CASSANDRA database.

In examples, production node 208 may store production information and/or stable copy of production data 210.

Backup node 212 generally represents any type or form of computing device that is capable of reading computer-executable instructions and/or storing information. In some examples, backup node 212 may represent a computer running storage software. Additional examples of backup node 212 include, without limitation, storage servers, database servers, application servers, and/or web servers configured to run certain software applications and/or provide various storage, database, and/or web services. Although illustrated as a single entity in FIG. 2, backup node 212 may include and/or represent a plurality of servers that work and/or operate in conjunction with one another. In embodiments, backup node 212 may be a constituent component of a backup cluster.

In examples, backup node 212 may store backup copy 214, record updates 216, complete backup records 218, redundant records 220, and/or stale records 222.

Cloud storage device 224 generally represents any type or form of computing device that is capable of reading computer-executable instructions and/or storing information. In some examples, cloud storage device 224 may represent a computer running storage management software. Additional examples of cloud storage device 224 include, without limitation, storage servers, database servers, application servers, and/or web servers configured to run certain software applications and/or provide various storage, database, and/or web services. In examples, cloud storage device 224 may be provided by AMAZON SIMPLE STORAGE SERVICE (S3). Although illustrated as a single entity in FIG. 2, cloud storage device 224 may include and/or represent a plurality of servers that work and/or operate in conjunction with one another.

In examples, cloud storage device 224 may store backup copy 214 and/or complete backup records 218.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
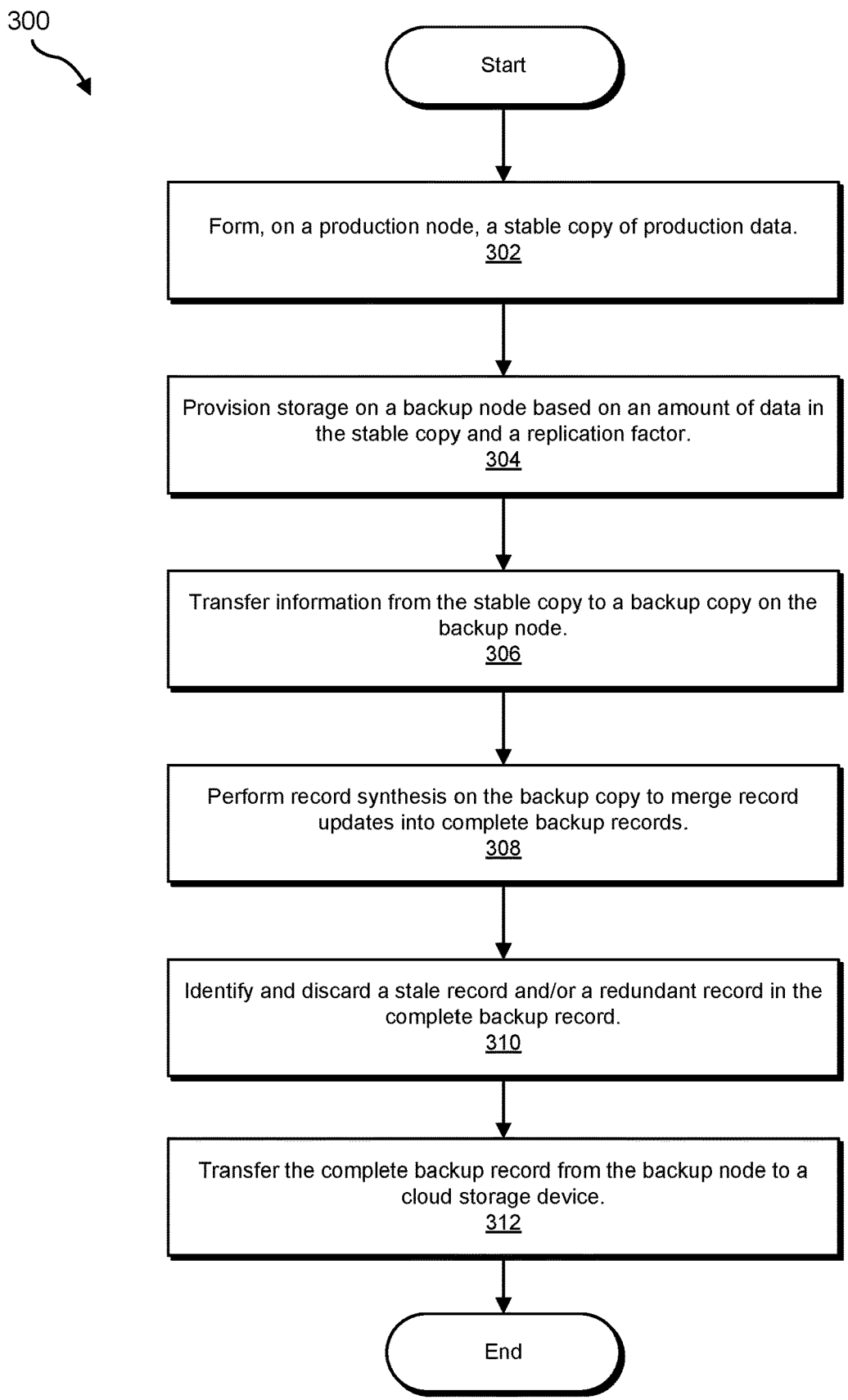
FIG. 3 is a flow diagram of an example method for backing-up an eventually-consistent database in a production cluster.

FIG. 3 is a flow diagram of an example computer-implemented method 300 for backing-up an eventually-consistent database in a production cluster. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may form, on production nodes, stable copies of production data. Forming stable production copies may provide independent instances of production data from which to perform rebase operations and/or enable expiring backups made previous to rebase points in time to enable reclaiming storage space. The systems described herein may perform step 302 in a variety of ways. For example, forming module 104 may, as part of computing device 202 in FIG. 2, form, on production node 208, stable copy 210 of production data. Producing stable copies establishes copies of rapidly-changing production data at respective instances in time.

In some embodiments, method 300 may include identifying a topology of a production cluster of which the production node is a constituent part to identify the production node as requiring backup. For example, system 100 and/or computing device 202 may identify a topology of a production cluster of which production node 208 is a constituent part. System 100 and/or computing device 202 may also identify at least one production cluster and/or production node (e.g., production node 208) as requiring backup.

In some embodiments, method 300 may include determining the amount of data in the stable copy, such as for use in step 304. For example, system 100 and/or computing device 202 may determine an amount of data in stable copy of production data 210.

As illustrated in FIG. 3, at step 304 one or more of the systems described herein may provision storage on backup nodes based on amounts of data in the stable copies and/or replication factors. The replication factors may be replication factors of keyspaces involved in backups. The systems described herein may perform step 304 in a variety of ways. For example, provisioning module 106 may, as part of computing device 202 in FIG. 2, provision storage on backup node 212 based on amount of data in stable copy 122 and/or replication factor 124. Amount of data in stable copy 122 may be an amount of data in stable copy of production data 210.

In an example, method 300 may include provisioning the backup node, in a backup cluster, based on the amount of data in the stable copy (i.e., the amount of data to be backed-up) and/or processing power of the backup node. For example, system 100 and/or computing device 202 may provision backup node 212 based on amount of data in stable copy 122 and/or processing power of backup node 212.

In examples, a number of production nodes in a production cluster of which the production node is a constituent part may not equal a number of backup nodes in a backup cluster of which the backup node is a constituent part. In some embodiments, a number of production nodes in a production cluster of which the production node is a constituent part may equal a number of backup nodes in a backup cluster of which the backup node is a constituent part.

As illustrated in FIG. 3, at step 306 one or more of the systems described herein may transfer information from the stable copies to backup copies on the backup nodes. The systems described herein may perform step 306 in a variety of ways. For example, first transferring module 108 may, as part of computing device 202 in FIG. 2, transfer information from stable copy of production data 210 to backup copy 214 on backup node 212. In examples, data from different stable back-up copies (i.e., replicas) may be transferred to the same node in the backup cluster in parallel from different nodes in the production cluster.

As illustrated in FIG. 3, at step 308 one or more of the systems described herein may optimize records by performing record synthesis on the backup copies to merge record updates into complete backup records. Record synthesis may merge updates to different columns at different times to recreate complete records. Step 308 may be performed locally at backup nodes to process backup copies in-parallel and/or substantially without inter-node communication. The systems described herein may perform step 308 in a variety of ways. For example, performing module 110 may, as part of computing device 202 in FIG. 2, perform record synthesis on backup copy 214 to merge record updates 216 into complete backup records 218.

As illustrated in FIG. 3, at step 310 one or more of the systems described herein may optimize records by identifying and/or discarding at least one stale record and/or at least one redundant record in the complete backup records and/or backup copy. The systems described herein may perform step 310 in a variety of ways. For example, identifying and discarding module 112 may, as part of computing device 202 in FIG. 2, identify and/or discard at least one stale record 222 and/or at least one redundant record 220 in complete backup records 218 and/or backup copy 214. Deduplicating may provide consistent data to reduce a probability that CASSANDRA will automatically perform repairs to fix inconsistencies in restored backups.

In examples, method 300 may include optimizing records to reclaim storage space. A common problem with a forever incrementally back-up strategy is reclaiming space because of backups expiring. In embodiments, the provided systems and methods may rebase backups by creating synthetic full backups from independent instances of production clusters. This may effectively create an independent chain, expire backups previous to a rebase point, and reclaim storage space previously used by expired backups. For example, method 300 may rebase at least a portion of backup copy 214, such as to form complete backup records 218.

In examples, method 300 may perform rebasing on backup copies in a backup node and not on data on production nodes. In an example, backup copies are partitioned among different backup nodes so each backup node may perform rebase operations independently. Rebasing may occur during backup expiry to delete backups and recover the associated storage space and/or to enable faster restores. Rebasing may be performed periodically (e.g., to consistently reduce a number of incremental backups. Overwritten data may be removed to produce a smaller resultant dataset. Following rebase operations, subsequent backups may be re-parented to create new backup chains. In examples, method 300 may delete backup copies may prior to a rebase point and reclaim storage space previously used by the deleted backups.

Figure 4:
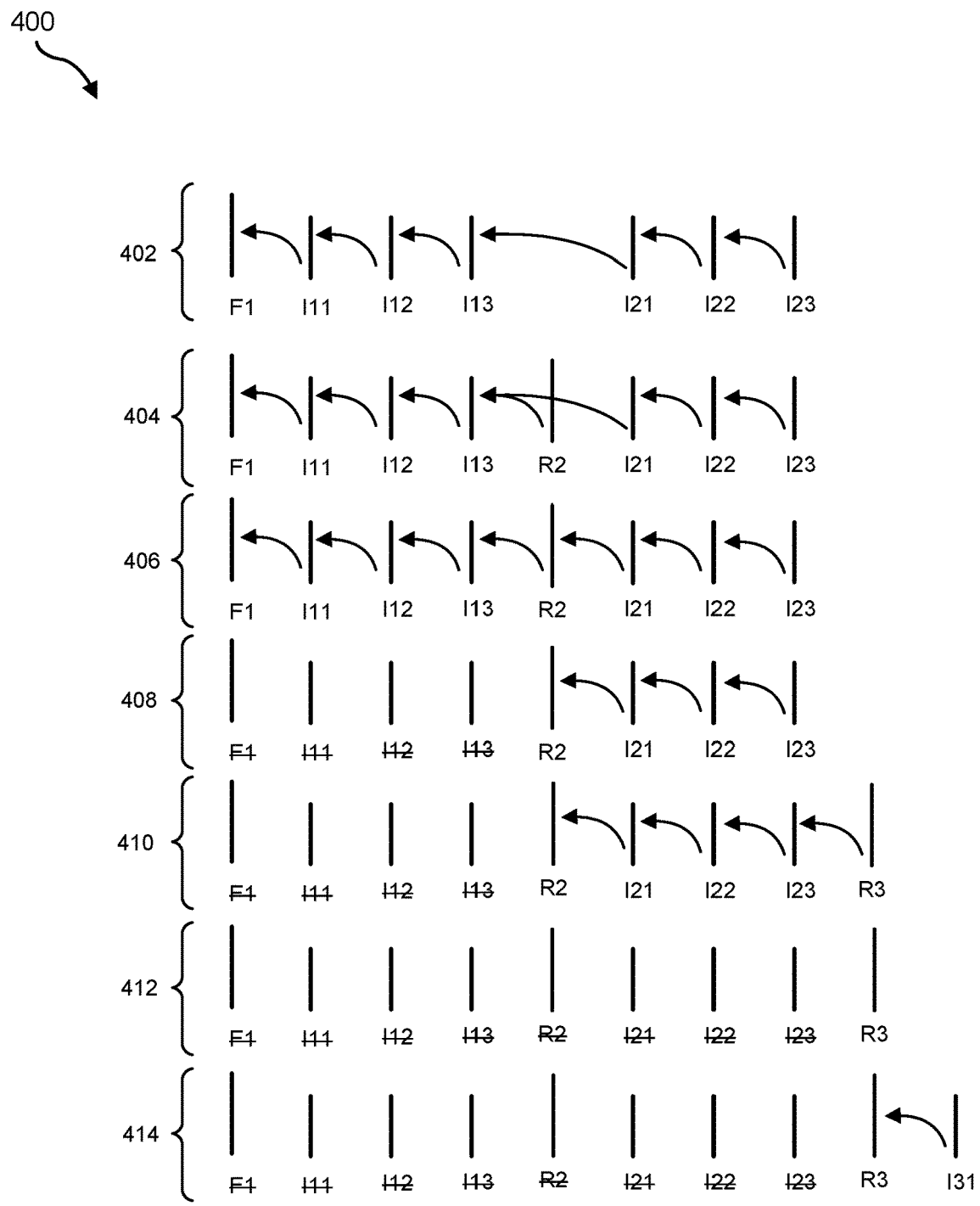
FIG. 4 is a diagram of an example of a rebase operation.

FIG. 4 depicts an example of a rebase operation 400. In FIG. 4, "F" represents a full backup, "I" represents an incremental backup, "R" represents a rebase backup, and the arrows represent dependency of a backup on a prior backup (e.g., an incremental backup being dependent on a full backup).

At time 402, full backup F1 has six incremental backups dependent thereon (I11,I12,I13,I21,I22,I23).

At time 404, a rebase operation creates rebase backup R2 from full backup F1 and incremental backups I11, I12, and I13.

At time 406, incremental backup I21 is reparented from I13 to R2.

At time 408, full backup F1 and incremental backups I11, I12, and I13 may be expired, as represented in FIG. 4 by strikethrough. In examples, any of full backup F1 and incremental backups I11,I12, and I13 may be deleted to save storage space.

At time 410, a rebase operation creates rebase backup R3 from rebase backup R2 and incremental backups I21, I22, and I23.

At time 412, rebase backup R2 and incremental backups I21, I22, and I23 may be expired, as represented in FIG. 4 by strikethrough. In examples, any of rebase backup R2 and incremental backups I21,I22, and I23 may be deleted to save storage space.

At time 414, incremental backup I31 is created and parented to rebase backup R3.

Returning to FIG. 3, at step 312 one or more of the systems described herein may transfer (i.e., upload) the complete backup records from the backup nodes to cloud storage devices. Backup data may be transferred in parallel from backup nodes in the backup cluster to backup media. The systems described herein may perform step 312 in a variety of ways. For example, second transferring module 114 may, as part of computing device 202 in FIG. 2, transfer complete backup records 218 from backup node 212 to cloud storage device 224.

In an example, method 300 may include reverting the backup node to a pre-transfer state. For example, at least a portion of backup copy 214 may be deleted from backup node 212.

In an embodiment, method 300 may include restoring the backup copy from the cloud storage device to the production node. For example, at least a portion of backup copy 214 and/or at least a portion of complete backup records 218 may be restored from cloud storage device 224 to computing device 202, server 206, production node 208, backup node 212, a different production node, and/or a device coupled to network 204.

In an embodiment, restoring may include determining amounts of data to process from backup copies. Keyspaces that need to be restored may be identified and chains of incremental backups are identified until full backups are identified for the keyspaces. Restoring may include computing an amount of data that needs to be transferred for each of the keyspaces being restored. In embodiments, restoring may include determining amounts of data to process from backup copies on cloud storage device 224. Restoring may include computing an amount of data that needs to be transferred from cloud storage device 224 for each of the keyspaces being restored.

In an example, restoring may include preparing backup clusters. Having identified amounts of data to be restored, nodes in backup clusters may be provisioned and storage on the backup nodes in the backup clusters may be provisioned. The number of nodes that need to be provisioned may depend on amounts of data that need to be processed and/or processing power of the backup nodes. Restoring may include distributing responsibilities of processing individual column families to the nodes in the backup cluster such that no two nodes process the same columns family and/or the data is equally distributed in each of the nodes. For example, restoring may include preparing backup clusters including backup node 212 and/or provisioning storage on backup node 212.

In examples, restoring may include downloading the data in parallel to each of the nodes in the backup cluster from the backup media (e.g., cloud storage device). For example, restoring may include downloading backup copy 214 from cloud storage device 224 to backup node 212.

In an embodiment, restoring may optionally include performing record synthesis that merges updates to different columns at different times to recreate complete records. Savings of storage space may be gained by performing record synthesis, such as when restoring from an incremental backup. For example, restoring may include performing record synthesis that merges record updates 216 to different columns at different times to recreate complete backup records 218. Optimizing backup data in this manner may reduce an amount of data to be restored.

In an embodiment, restoring may include preparing production clusters. Restoring may include creating schemas for the keyspaces that need to be restored and/or preparing production clusters to receive data from backup clusters. For example, restoring may include preparing a production cluster including production node 208 to receive data from backup node 212.

In examples, restoring may include transferring data. Data may be transferred (e.g., scattered) in-parallel from backup nodes in the backup clusters to production nodes in production clusters. Restoring may include multiply writing records to different production nodes depending on replication factors. In examples, restoring may include transferring data from backup node 212 to production node 208.

In embodiments, restoring may include removing temporary data structures on the backup nodes in the backup clusters. In examples, restoring may include reverting backup nodes to a pre-transfer state. For example, restoring may include reverting backup node 212 to a pre-transfer state.

As detailed above, the steps outlined in method 300 in FIG. 3 may provide methods for backing-up an eventually-consistent database in a production cluster and/or restoring an eventually-consistent database from a cloud storage device. In examples, the provided systems and methods may be used with scale-out high-performance databases. By doing so, in examples, the systems and methods described herein may improve the functioning of computing devices by automatically protecting large datasets within short spans of time, providing authoritative copies, solving deduplication challenges, backing-up records stored in changing architectures, backing-up records of reconfigured nodes, and/or backing-up data files that increase in size over time, thus enabling cost-effective storage management. Also, in examples, the systems and methods described herein may also save power by reducing a quantity of data to be transferred.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. The singular portends the plural where practicable. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for backing-up an eventually-consistent database in a production cluster, at least a portion of the method being performed by a computing device comprising at least one processor, the method comprising:

forming, on a production node, a stable copy of production data;

provisioning storage on a backup node based on an amount of data in the stable copy and a replication factor;

transferring information from the stable copy to a backup copy on the backup node;

performing record synthesis on the backup copy to merge record updates into complete backup records;

identifying and discarding any stale records and any redundant records in the complete backup records; and transferring the complete backup records from the backup node to a cloud storage device.

2. The computer-implemented method of claim 1, further comprising:

identifying a topology of a production cluster of which the production node is a constituent part to identify the production node as requiring backup.

3. The computer-implemented method of claim 1, further comprising:

determining the amount of data in the stable copy.

4. The computer-implemented method of claim 1, further comprising:

provisioning the backup node in a backup cluster based on the amount of data in the stable copy.

5. The computer-implemented method of claim 1, further comprising:

reverting the backup node to a pre-transfer state.

6. The computer-implemented method of claim 1, wherein a number of production nodes in a production cluster of which the production node is a constituent part does not equal a number of backup nodes in a backup cluster of which the backup node is a constituent part.

7. The computer-implemented method of claim 1, further comprising:

restoring the backup copy from the cloud storage device to the production node.

8. A system for backing-up an eventually-consistent database in a production cluster, the system comprising:

a forming module, stored in a memory, that forms, on a production node, a stable copy of production data;

a provisioning module, stored in the memory, that provisions storage on a backup node based on an amount of data in the stable copy and a replication factor;

a first transferring module, stored in the memory, that transfers information from the stable copy to a backup copy on the backup node;

a performing module, stored in the memory, that performs record synthesis on the backup copy to merge record updates into complete backup records;

an identifying and discarding module, stored in the memory, that identifies and discards any stale records and any redundant records in the complete backup records;

a second transferring module, stored in the memory, that transfers the complete backup records from the backup node to a cloud storage device; and at least one physical processor that executes the forming module, the provisioning module, the first transferring module, the performing module, the identifying and discarding module, and the second transferring module.

9. The system of claim 8, further comprising:

an identifying module, stored in the memory, that identifies a topology of a production cluster of which the production node is a constituent part to identify the production node as requiring backup.

10. The system of claim 8, further comprising:

a determining module, stored in the memory, that determines the amount of data in the stable copy.

11. The system of claim 8, further comprising:

a provisioning module, stored in the memory, that provisions the backup node in a backup cluster based on the amount of data in the stable copy.

12. The system of claim 8, further comprising:

a reverting module, stored in the memory, that reverts the backup node to a pre-transfer state.

13. The system of claim 8, wherein a number of production nodes in a production cluster of which the production node is a constituent part does not equal a number of backup nodes in a backup cluster of which the backup node is a constituent part.

14. The system of claim 8, further comprising:

a restoring module, stored in the memory, that restores the backup copy from the cloud storage device to the production node.

15. A non-transitory computer-readable medium comprising one or more computer-executable instructions that, when executed by at least one processor of a computing device, cause the computing device to:

form, on a production node, a stable copy of production data;

provision storage on a backup node based on an amount of data in the stable copy and a replication factor;

transfer information from the stable copy to a backup copy on the backup node;

perform record synthesis on the backup copy to merge record updates into complete backup records;

identify and discard any stale records and any redundant records in the complete backup records; and transfer the complete backup records from the backup node to a cloud storage device.

16. The non-transitory computer-readable medium of claim 15, wherein the computer-executable instructions further cause the computing device to:

identify a topology of a production cluster of which the production node is a constituent part to identify the production node as requiring backup.

17. The non-transitory computer-readable medium of claim 15, wherein the computer-executable instructions further cause the computing device to:

determine the amount of data in the stable copy.

18. The non-transitory computer-readable medium of claim 15, wherein the computer-executable instructions further cause the computing device to:

provision the backup node in a backup cluster based on the amount of data in the stable copy.

19. The non-transitory computer-readable medium of claim 15, wherein the computer-executable instructions further cause the computing device to:

revert the backup node to a pre-transfer state.

20. The non-transitory computer-readable medium of claim 15, wherein a number of production nodes in a production cluster of which the production node is a constituent part does not equal a number of backup nodes in a backup cluster of which the backup node is a constituent part.

* * * * *